US011193839B2

(12) United States Patent
Lu et al.

(10) Patent No.: US 11,193,839 B2
(45) Date of Patent: *Dec. 7, 2021

(54) SYSTEM AND METHOD FOR SENSING AN ELECTROMAGNETIC CHARATERISTIC OF A COMPONENT HAVING A RESIDUALLY MAGNETIZED REGION (71) Applicant: Baker Hughes, a GE Company, LLC, Houston, TX (US)

(72) Inventors: Dan Tho Lu, Minden, NV (US); Brant Wilhelm, Minden, NV (US)

(73) Assignee: Baker Hughes, a GE Company, LLC, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/811,583

(22) Filed: Mar. 6, 2020

(65) Prior Publication Data

US 2020/0209080 A1    Jul. 2, 2020

Related U.S. Application Data

(63) Continuation of application No. 16/388,964, filed on Apr. 19, 2019, now Pat. No. 10,663,363, which is a (Continued)

(51) Int. Cl.
*G01L 3/10*      (2006.01)
*G01B 7/14*     (2006.01)
*G01L 1/12*     (2006.01)

(52) U.S. Cl.
CPC ............. *G01L 3/102* (2013.01); *G01L 3/101* (2013.01); *G01B 7/14* (2013.01); *G01L 1/125* (2013.01); *G01L 1/127* (2013.01); *G01L 3/105* (2013.01)

(58) Field of Classification Search
CPC ......... G01L 3/105; G01L 3/102; G01L 1/127; G01L 1/125; G01B 7/14
See application file for complete search history.

(56) References Cited

U.S. PATENT DOCUMENTS 3,866,462 A   2/1975  Fraudin
4,566,338 A   1/1986  Fleming et al.
(Continued)

FOREIGN PATENT DOCUMENTS

JP   H11-183278 A    7/1999
JP   2005-241563 A   9/2005
(Continued)

OTHER PUBLICATIONS

Extended European Search Report and Opinion issued in connection with corresponding EP Application No. 16199752.3, dated Jul. 11, 2017.
(Continued)

*Primary Examiner* — Jonathan M Dunlap
(74) *Attorney, Agent, or Firm* — Mintz Levin Cohn Ferris Glovsky and Popeo, PC; Lisa Adams (57) ABSTRACT

A system for measuring torque on a component having a residually magnetized region is provided. The system includes a torque sensor for sensing an electromagnetic characteristic of the component and transmitting a plurality of signals that are indicative of the electromagnetic characteristic. The system also includes a computer communicatively coupled to the torque sensor for receiving the signals. The computer includes a processor and a memory. The processor is programmed to determine, using the signals, that the torque sensor is affected by the residually magnetized region of the component.

15 Claims, 5 Drawing Sheets

Related U.S. Application Data continuation of application No. 15/248,180, filed on Aug. 26, 2016, now Pat. No. 10,267,693.

(56) References Cited

U.S. PATENT DOCUMENTS

| | | | |
|---|---|---|---|
| 4,989,460 A | 2/1991 | Mizuno et al. | |
| 5,542,304 A | 8/1996 | Sasada et al. | |
| 5,902,934 A | 5/1999 | Sprague et al. | |
| 5,923,165 A * | 7/1999 | Horita | G01V 3/08 324/239 |
| 7,845,243 B2 | 12/2010 | Poirier et al. | |
| 8,578,794 B2 | 11/2013 | Lee | |
| 8,581,578 B2 * | 11/2013 | Momose | G01R 33/10 324/228 |
| 8,677,835 B2 | 3/2014 | Goto et al. | |
| 9,146,163 B2 | 9/2015 | Sipila et al. | |
| 10,352,683 B2 | 7/2019 | Ouellette | |
| 2003/0155627 A1 | 8/2003 | Fukaya et al. | |
| 2007/0089287 A1 | 4/2007 | Harata et al. | |
| 2008/0173103 A1 | 7/2008 | Shimizu et al. | |
| 2008/0257069 A1 | 10/2008 | Poirier et al. | |
| 2009/0025488 A1 | 1/2009 | Sihler et al. | |
| 2009/0301223 A1 * | 12/2009 | Sihler | G01L 3/102 73/862.333 |
| 2010/0018328 A1 | 1/2010 | May | |
| 2012/0031202 A1 | 2/2012 | Goto et al. | |
| 2012/0126833 A1 | 5/2012 | Dooley | |
| 2013/0116955 A1 * | 5/2013 | Williams | G01R 15/20 702/64 |
| 2014/0062488 A1 | 3/2014 | Stamatescu et al. | |
| 2014/0165741 A1 | 6/2014 | Sihler et al. | |
| 2014/0182388 A1 | 7/2014 | Sipila et al. | |
| 2014/0366637 A1 | 12/2014 | Brummel et al. | |
| 2015/0028859 A1 | 1/2015 | May | |
| 2015/0323397 A1 | 11/2015 | May | |
| 2016/0245737 A1 | 8/2016 | Davis et al. | |
| 2017/0023347 A1 | 1/2017 | Ouellette | |
| 2019/0033052 A1 | 1/2019 | Amineh et al. | |

FOREIGN PATENT DOCUMENTS

| | | | | |
|---|---|---|---|---|
| JP | 2009-145048 A | | 7/2009 | |
| WO | WO-2018031042 A1 * | | 2/2018 | E21B 47/10 |

OTHER PUBLICATIONS

Sarhan, et al., "Compensation of Machine Tool Spindle Error Motions in the Radial Direction for Accurate Monitoring of Cutting Forces Utilizing Sensitive Displacement Sensors", Proceedings of the World Congress on Engineering (WCE), 2011, London UK, Jul. 6-8, 2011, 5 pages.

Anandan, et al., "Implementation of Donaldson Reversal Technique to Measure Error Motions of Ultra-High-Speed Spindles", 2 pages.

* cited by examiner

SYSTEM AND METHOD FOR SENSING AN ELECTROMAGNETIC CHARATERISTIC OF A COMPONENT HAVING A RESIDUALLY MAGNETIZED REGION

CROSS-REFERENCE TO RELATED APPLICATIONS

This application is a continuation of U.S. patent application Ser. No. 16/388,964, filed Apr. 19, 2019, which is a continuation of U.S. patent application Ser. No. 15/248,180 entitled "SYSTEM AND METHOD FOR MEASURING TORQUE ON A ROTATING COMPONENT," filed Aug. 28, 2016, which are hereby incorporated herein by reference in their entirety.

BACKGROUND

The field of this disclosure relates generally to systems and methods for measuring torque on a component and, more particularly, to systems and methods for measuring torque on a component that is residually magnetized.

Many known ferromagnetic components (e.g., rotatable components such as drive shafts) are fabricated using magnetism. For example, at least some known fabrication techniques include the use of magnetism to test for cracks in a component, to lift (or otherwise handle) a component (e.g., to hold a component in a chuck), or to weld a component (e.g., using alternating or direct electrical current). It is thus common for at least one region of a component to remain magnetized after the fabrication process is complete, and this region of residual magnetism can adversely influence the functionality of devices such as sensors that rely on electromagnetism to sense a characteristic of the component.

SUMMARY

In one aspect, a system for measuring torque on a component having a residually magnetized region is provided. The system includes a torque sensor for sensing an electromagnetic characteristic of the component and transmitting a plurality of signals that are indicative of the electromagnetic characteristic. The system also includes a computer communicatively coupled to the torque sensor for receiving the signals. The computer includes a processor and a memory. The processor is programmed to determine, using the signals, that the torque sensor is affected by the residually magnetized region of the component.

In another aspect, a method for measuring torque on a component having a residually magnetized region is provided. The method includes transmitting, from a torque sensor that senses an electromagnetic characteristic of the component, a plurality of signals that are indicative of the electromagnetic characteristic. The method also includes receiving the signals at a computer that is communicatively coupled to the torque sensor and has a processor and a memory. The method further includes determining, at the computer and using the signals, that the torque sensor is affected by the residually magnetized region of the component.

In another aspect, a computer for measuring torque on a component having a residually magnetized region using a torque sensor that senses an electromagnetic characteristic of the component and transmits a plurality of signals that are indicative of the electromagnetic characteristic is provided. The computer includes a memory and a processor selectively coupled to the torque sensor for receiving the signals, said processor programmed to determine, using the signals, that the torque sensor is affected by the residually magnetized region of the component.

DETAILED DESCRIPTION

The following detailed description illustrates systems and methods by way of example and not by way of limitation. The description should enable one of ordinary skill in the art to make and use the systems, and the description describes several embodiments of the systems, including what is presently believed to be the best modes of making and using the systems. Exemplary systems are described herein as being useful for measuring torque on a component, such as a rotatable drive shaft. However, it is contemplated that the systems have general application to a broad range of systems in a variety of fields other than torque measurement.

The present disclosure provides techniques for an improved torque-measurement system and method. For example, some components are fabricated or otherwise handled using devices that apply a magnetic field to the component. As such, a region of the component may remain magnetized even after the fabrication or handling is complete, and this phenomenon is commonly referred to as residual magnetism. The presence of residual magnetism in a component can have an adverse effect on a sensor that is later used to sense an electromagnetic characteristic of the component such as, for example, when measuring torque on the component during operation of a system in which the component is installed. As described more fully below, some embodiments of the disclosed subject matter relate to a system and a method that are designed to account for (or cancel-out) the effect of such residual magnetism. Other embodiments are within the scope of the disclosed subject matter.

Figure 1:
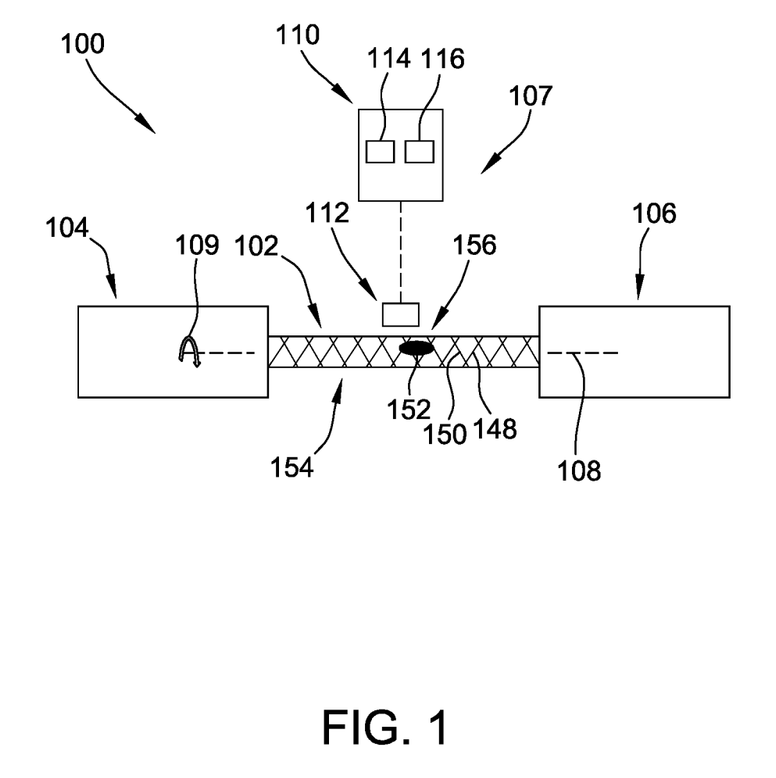
FIG. 1 is a schematic illustration of an exemplary rotary machine.

FIG. 1 illustrates an exemplary rotary machine 100. In the exemplary embodiment, rotary machine 100 has a component 102 (e.g., a drive shaft or drive coupling) operatively coupled between a driver apparatus 104 (e.g., an engine) and a driven apparatus 106 (e.g., a generator), such that component 102 rotates about an axis 108 in a direction 109. Alternatively, component 102 may be any suitable type of component that is rotatable in any suitable manner for any suitable purpose (e.g., component 102 may not be a drive component). Although component 102 rotates about axis 108 in the exemplary embodiment, component 102 may not have an axis of rotation in some embodiments.

In the exemplary embodiment, rotary machine 100 also includes a system 107 for measuring torque on component 102. System 107 includes a computing device 110 (broadly a "computer") and a sensor 112 communicatively coupled to computing device 110 (e.g., via a hardwired connection and/or a wireless connection). Computing device 110 includes a controller or processing device 114 (broadly a "processor") such as a general purpose central processing unit (CPU), a graphics processing unit (GPU), a microcontroller, a reduced instruction set computer (RISC) processor, an application specific integrated circuit (ASIC), a programmable logic controller (PLC), a field programmable gate array (FPGA), a digital signal processing (DSP) device, and/or any other circuit or processing device capable of executing the functions described herein. The methods described herein may be encoded as executable instructions embodied in a computer readable medium 116 of computing device 110, including, without limitation, a storage device and/or a memory device (broadly a "memory"). Such instructions, when executed by controller or processing device 114, cause controller or processing device 114 to perform at least some of the method steps described herein. The above examples are exemplary only, and thus are not intended to limit in any way the definition and/or meaning of the terms computer, processor, and memory.

Figure 2:
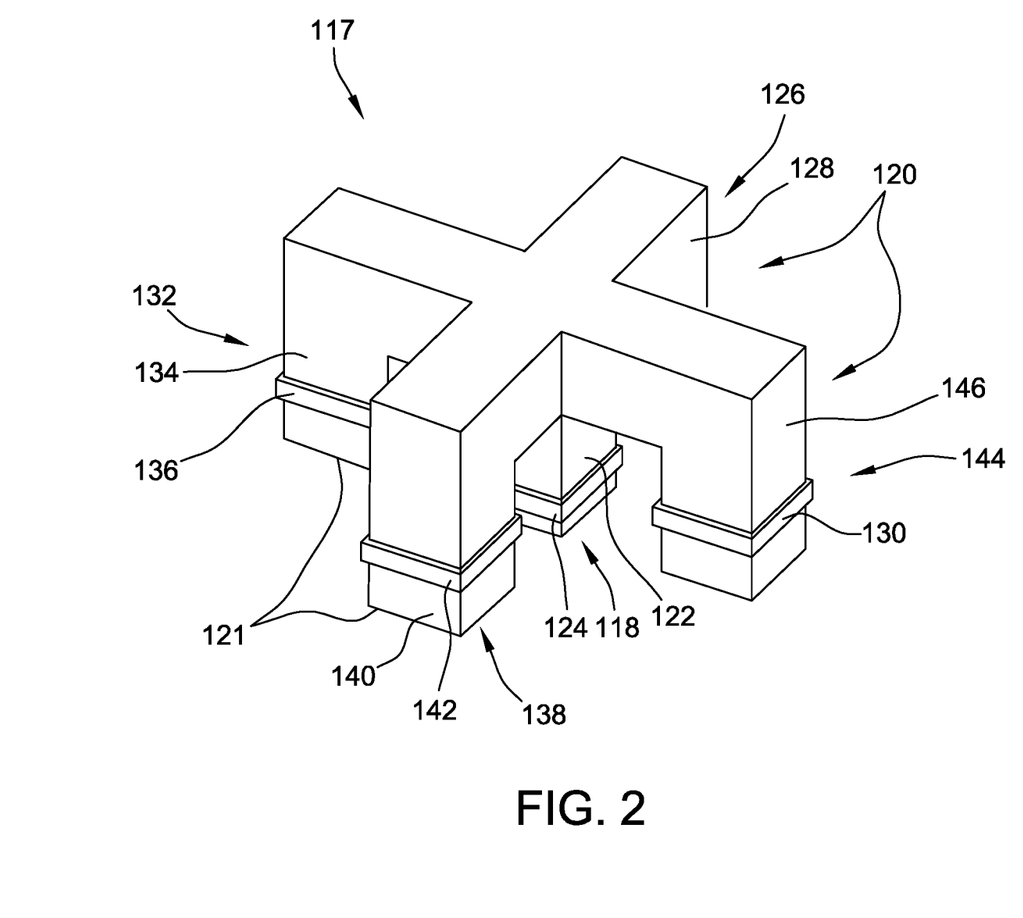
FIG. 2 is a schematic perspective view of an exemplary sensor for use in measuring the torque on a component of the rotary machine shown in FIG. 1.

FIG. 2 is a schematic illustration of an exemplary sensor 117 for use in system 107. In the exemplary embodiment, sensor 117 is a non-contact, four-branch, magnetostrictive torque sensor having a core element 118 and a plurality of branches elements 120 electrically connected to core element 118 such that core element 118 and branch elements 120 are oriented substantially parallel to one another in spaced-apart relation with core element 118 positioned between branch elements 120. In other embodiments, core element 118 and branch elements 120 may be arranged in any suitable manner and may have any suitable orientation relative to one another.

In the exemplary embodiment, core element 118 has a core shaft 122 and a drive (or excitation) coil 124 that circumscribes core shaft 122. Branch elements 120 include: a first branch element 126 having a first shaft 128 and a first sensing coil (not shown) that circumscribes first shaft 128; a second branch element 132 having a second shaft 134 and a second sensing coil 136 that circumscribes second shaft 134; a third branch element 138 having a third shaft 140 and a third sensing coil 142 that circumscribes third shaft 140; and a fourth branch element 144 having a fourth shaft 146 and a fourth sensing coil 130 that circumscribes fourth shaft 146. In other embodiments, sensor 117 may be any suitable type of sensor constructed in any suitable manner that enables system 107 to function as described herein. For example, in some embodiments, sensor 117 may have any suitable number of branch elements 120 (e.g., sensor 117 may have eight branch elements 120 or another multiple of four branch elements 120), and/or sensor 117 may not be a torque sensor (e.g., sensor 117 may not be a magnetostrictive torque sensor).

In the exemplary embodiment, sensor 117 is designed to be positioned adjacent component 102 such that elements 118 and 120 are oriented towards component 102 and are spaced apart from component 102 at their tips 121, thereby sensing an electromagnetic characteristic of component 102 which is indicative of the torque on component 102. As used herein, the term "electromagnetic characteristic" of component 102 refers to a characteristic of component 102 that is indicative of its ability to transmit electromagnetic energy (e.g., magnetic flux and/or electric flux). For example, in the exemplary embodiment, the "electromagnetic characteristic" is a magnetic permeability of component 102 as evidenced by a voltage across elements 118 and 120. In other embodiments, sensor 117 may be designed to sense any suitable electromagnetic characteristic of component 102.

When torque is imparted to component 102 for rotating component 102 about axis 108, component 102 experiences at least one circumferential line of tension 148 (shown in FIG. 1) and at least one circumferential line of compression 150 (shown in FIG. 1), such that sensor 117 is selectively positioned relative to component 102 with first branch element 126 and third branch element 138 oriented along the same line of tension 148, and with second branch element 132 and fourth branch element 144 oriented along the same line of compression 150. In that regard, sensor 117 can generate magnetic flux through component 102 from core element 118 to branch elements 120, and sensor 117 can transmit to computing device 110 signals indicative of the voltage sensed at each respective branch element 120.

Using the voltage signals received from sensor 117, computing device 110 can measure the torque on component 102 (e.g., in real time) as set forth in more detail below. In other embodiments, sensor 117 may have any suitable positioning relative to component 102, and may sense (and transmit signals indicative of) any suitable electromagnetic characteristic of component 102 (e.g., a characteristic other than magnetic permeability) that facilitates enabling computing device 110 to measure the torque on component 102 in the manner described herein. Alternatively, sensor 117 may transmit any suitable signal(s) to computing device 110 that facilitate enabling computing device 110 to assess any suitable structural or functional aspect of component 102. For example, computing device 110 may not measure the torque on component 102 in some embodiments (e.g., computing device 110 may instead measure axial stress on component 102).

Notably, as a result of its fabrication process, component 102 has at least one residually magnetized region 152 (shown in FIG. 1), which can alter the magnetic permeability of component 102 (and, therefore, the voltage across elements 118 and 120). For example, if sensor 117 is positioned/oriented as set forth above (i.e., with branch elements 126 and 138 oriented along the same line of tension 148, and with branch elements 132 and 144 oriented along the same line of compression 150) at a segment 154 of component 102 that is substantially free of (or does not have a substantial amount of) residual magnetization, the voltage sensed at first branch element 126 would be the same as the voltage sensed at third branch element 138, and the voltage sensed at second branch element 132 would be the same as the voltage sensed at fourth branch element 144. However, if sensor 117 is positioned/oriented as set forth above (i.e., with branch elements 126 and 138 oriented along the same line of tension 148, and with branch elements 132 and 144 oriented along the same line of compression 150) at a segment 156 of component 102 having residually magnetized region 152, the residual magnetization of region 152 can cause the voltage sensed at first branch element 126 to be different than the voltage sensed at third branch element 138 (or vice versa), and/or can cause the voltage sensed at second branch element 132 to be different than the voltage sensed at fourth branch element 144 (or vice versa). These differences in voltage can impair the ability of computing device 110 to accurately measure the torque on component 102. In that regard, as set forth in more detail below, computing device 110 is designed to identify and account for such differences in order to facilitate obtaining an accurate torque measurement despite the presence of residually magnetized region 152 near sensor 117.

More specifically, in the exemplary embodiment, sensor 117 is designed to transmit to computing device 110: a first voltage signal $V_1$ that is indicative of voltage sensed at first branch element 126; a second voltage signal $V_2$ that is indicative of voltage sensed at second branch element 132; a third voltage signal $V_3$ that is indicative of voltage sensed at third branch element 138; and a fourth voltage signal $V_4$ that is indicative of voltage sensed at fourth branch element 144. Notably, when component 102 is not rotating and sensor 117 is positioned/oriented as set forth above (i.e., with branch elements 126 and 138 oriented along the same line of tension 148, and with branch elements 132 and 144 oriented along the same line of compression 150) at segment 154 of component 102, all voltage signals $V_1$, $V_2$, $V_3$, and $V_4$ are the same (i.e., $V_1=V_o$, $V_2=V_o$, $V_3=V_o$, and $V_4=V_0$). As such, when torque is imparted to component 102, the applied stress causes the magnetic permeability of component 102 to change, such that the voltage sensed along the corresponding line of tension 148 increases by the same amount that the voltage sensed along the corresponding line of compression 150 decreases. In other words, voltage signals $V_1$ and $V_3$ increase by an amount $\sigma$, and voltage signals $V_2$ and $V_4$ decrease by the amount $\sigma$ (i.e., $V_1=V_o+\sigma$; $V_2=V_o-\sigma$; $V_3=V_o+\sigma$; $V_4=V_o-\sigma$). As a result, first voltage signal $V_1$ remains the same as third voltage signal $V_3$, and second voltage signal $V_2$ remains the same as fourth voltage signal $V_4$ (i.e., $V_1=V_3$ and $V_2=V_4$).

However, when torque is imparted to component 102 with sensor 117 positioned/oriented as set forth above (i.e., with branch elements 126 and 138 oriented along the same line of tension 148, and with branch elements 132 and 144 oriented along the same line of compression 150) at segment 156 having residually magnetized region 152, component 102 (and, hence, residually magnetized region 152) rotates about axis 108, such that residually magnetized region 152 periodically (or continuously) affects the sensing accuracy of at least one branch element 126, 132, 138, and 144. More specifically, the voltage sensed at an affected branch element 126, 132, 138, or 144 increases relative to the voltage sensed at an unaffected branch element 126, 132, 138, or 144 oriented along the same line of tension 148 or line of compression 150. For example, if only first branch element 126 is affected by region 152, then first voltage signal $V_1$ increases by an amount $\Delta$ as compared to third voltage signal $V_3$ (i.e., $V_1=V_o+\sigma+\Delta$ and $V_3=V_o+\sigma$); if only second branch element 132 is affected by region 152, then second voltage signal $V_2$ increases by amount $\Delta$ as compared to fourth voltage signal $V_4$ (i.e., $V_2=V_o+\sigma+\Delta$ and $V_4=Vo+\sigma$); if only third branch element 138 is affected by region 152, then third voltage signal $V_3$ increases by amount $\Delta$ as compared to first voltage signal $V_1$ (i.e., $V_3=V_o+\sigma+\Delta$ and $V_1=Vo+\sigma$); and if only fourth branch element 144 is affected by region 152, then fourth voltage signal $V_4$ increases by amount $\Delta$ as compared to second voltage signal $V_2$ (i.e., $V_4=V_o+\sigma+\Delta$ and $V_2=Vo+\sigma$).

By comparing voltage signals that would otherwise be the same in the absence of residual magnetization (i.e., by comparing voltage signals $V_1$ and $V_3$, and by comparing voltage signals $V_2$ and $V_4$), computing device 110 can thus determine which branch element(s) 126, 132, 138, and/or 144 (if any) are affected by region 152, and to what extent such branch element(s) 126, 132, 138, and/or 144 are affected. For example, computing device 110 can determine whether first branch element 126 and/or third branch element 138 is affected by region 152 by subtracting third voltage signal $V_3$ from first voltage signal $V_1$ to calculate a signal difference $V_{1-3}$ (i.e., $V_{1-3}=V_1-V_3$) If difference $V_{1-3}$ is greater than zero (i.e., if $V_{1-3}>0$), then computing device 110 determines that only first branch element 126 is affected by region 152, and computing device 110 thus calculates a modified first voltage signal $V_1'$ that accounts for (or cancels out) the effect of region 152 by subtracting difference $V_{1-3}$ from first voltage signal $V_1$ (i.e., $V_1'=V_1-V_{1-3}$). If, on the other hand, difference $V_{1-3}$ is less than zero (i.e., if $V_{1-3}<0$), then computing device 110 determines that only third branch element 138 is affected by region 152, and computing device 110 calculates a modified third voltage signal $V_3'$ that accounts for (or cancels out) the effect of region 152 by subtracting the absolute value of difference $V_{1-3}$ from third voltage signal $V_3$ (i.e., $V_3'=V_3-|V_{1-3}|$). If, however, difference $V_{1-3}$ equals zero (i.e., $V_{1-3}=0$), then computing device 110 determines that third voltage signal $V_3$ is equal to first voltage signal $V_1$ (i.e., $V_3=V_1$). Computing device 110 thus determines either that neither first branch element 126 nor third branch element 138 is affected by region 152, or that first branch element 126 and third branch element 138 are equally affected by region 152, and that neither first voltage signal $V_1$ nor third voltage signal $V_3$ needs to be modified.

Similarly, computing device 110 can also determine whether second branch element 132 and/or fourth branch element 144 is affected by region 152 by subtracting fourth voltage signal $V_4$ from second voltage signal $V_2$ to calculate a signal difference $V_{2-4}$ (i.e., $V_{2-4}=V_2-V_4$). If difference $V_{2-4}$ is greater than zero (i.e., if $V_{2-4}>0$), then computing device 110 determines that only second branch element 132 is affected by region 152, and computing device 110 calculates a modified second voltage signal $V_2'$ that accounts for (or cancels out) the effect of region 152 by subtracting difference $V_{2-4}$ from second voltage signal $V_2$ (i.e., $V_2'=V_2-V_{2-4}$). If, on the other hand, difference $V_{2-4}$ is less than zero (i.e., if $V_{2-4}<0$), then computing device 110 determines that only fourth branch element 144 is affected by region 152, and computing device 110 calculates a modified third voltage signal $V_4'$ that accounts for (or cancels out) the effect of region 152 by subtracting the absolute value of difference $V_{2-4}$ from fourth voltage signal $V_4$ (i.e., $V_4'=V_4-|V_{2-4}|$). If, however, difference $V_{2-4}$ equals zero (i.e., $V_{2-4}=0$), then computing device 110 determines that fourth voltage signal $V_4$ is equal to second voltage signal $V_2$ (i.e., $V_4=V_2$). Computing device 110 thus determines either that neither second branch element 132 nor fourth branch element 144 is affected by region 152, or that second branch element 132 and fourth branch element 144 are equally affected by region 152, and that neither second voltage signal $V_2$ nor fourth voltage signal $V_4$ needs to be modified.

After having determined which, if any, branch element(s) 126, 132, 138, and/or 144 are affected by region 152, and modifying the associated voltage signals(s) $V_1$, $V_2$, $V_3$, and/or $V_4$ accordingly, computing device 110 can then calculate an output voltage signal $V_T$, that more accurately reflects the torque on component 102. More specifically, to calculate output voltage signal $V_T$, computing device 110 subtracts the sum of $V_2$ (or $V_2'$) and $V_4$ (or $V_4'$) from the sum of $V_1$ (or $V_1'$) and $V_3$ (or $V_3'$) (i.e., $V_T$, $=[(V_1$ or $V_1')+(V_3$ or $V_3'$)] [($V_2$ or $V_2'$)+($V_4$ or $V_4'$)]. Output voltage signal $V_\tau$, is thus indicative of the true amount of torque on component 102, as if region 152 was not present in component 102. Notably, computing device 110 can perform such calculations in real time (e.g., as component 102 rotates), enabling continuous (or periodic) monitoring of the torque on component 102.

As used herein, the term "voltage signal" refers to any type of signal that is indicative of an amount of voltage. As such, in relation to a voltage signal, the terms "increase," "decrease," "subtract from," "account for," "cancel out," or any variation thereof refer to modifying the voltage signal in a manner that changes the amount of voltage of which the signal is indicative. Moreover, as used herein, a voltage signal is "modified" by either: altering a property of the signal itself so as to change the amount of voltage of which the signal is indicative; or by receiving the voltage signal which is indicative of a first amount of voltage and transmitting a new voltage signal indicative of a second amount of voltage that is different than the first amount of voltage.

Figure 3:
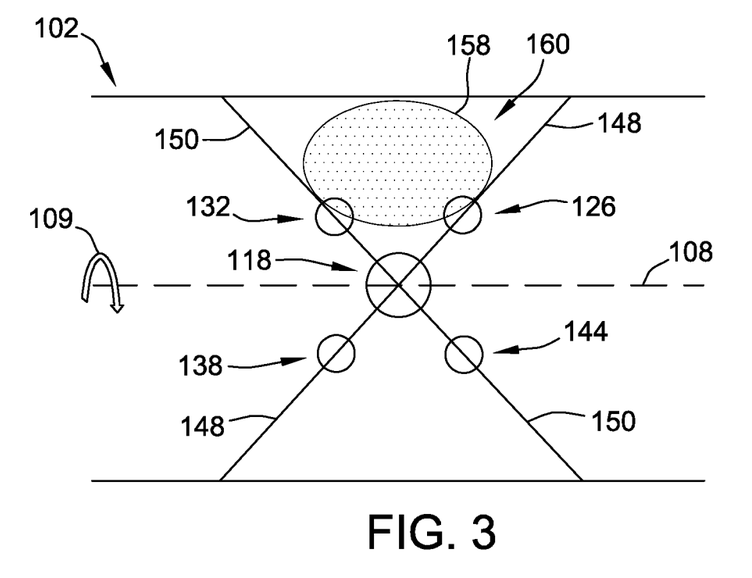
FIG. 3 is a schematic illustration of the sensor shown in FIG. 2 when measuring torque on the component shown in FIG. 1 at a first residually magnetized region of the component having a first angular position.
Figure 4:
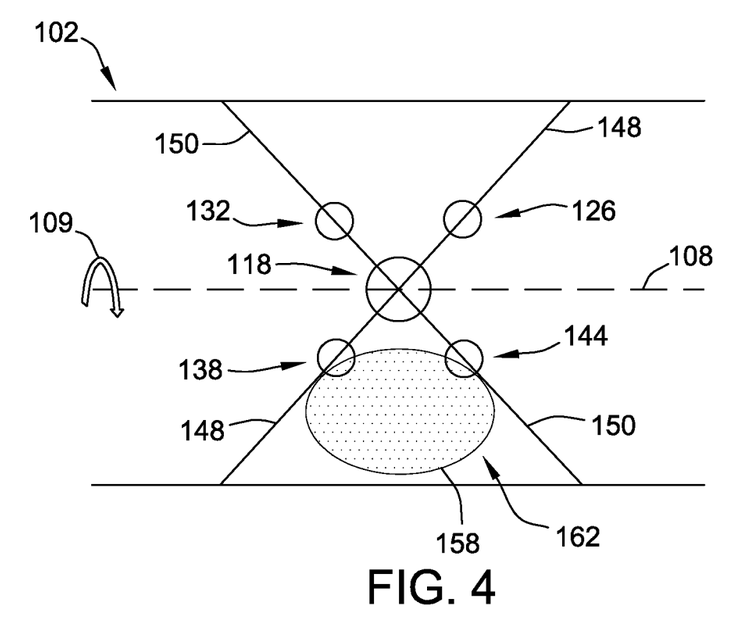
FIG. 4 is a schematic illustration of the sensor shown in FIG. 2 when measuring torque on the component shown in FIG. 1 at a second angular position of the first residually magnetized region shown in FIG. 3.

As an example of system 107 in operation using sensor 117, FIGS. 3 and 4 are schematic illustrations of sensor 117 when measuring torque on component 102 at a first residually magnetized region 158 of component 102 having a first angular position 160 and a second angular position 162, respectively. More specifically, as component 102 rotates about axis 108, first residually magnetized region 158 likewise rotates about axis 108, thereby traveling from first angular position 160 to second angular position 162. In that regard, FIG. 3 illustrates first residually magnetized region 158 at first angular position 160, and FIG. 4 illustrates first residually magnetized region 158 at second angular position 162.

Figure 5:
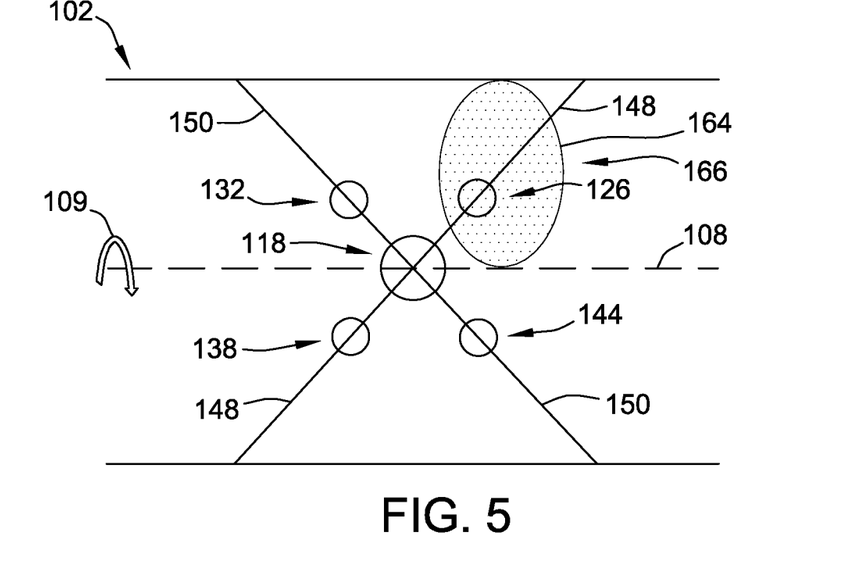
FIG. 5 is a schematic illustration of the sensor shown in FIG. 2 when measuring torque on the component shown in FIG. 1 at a second residually magnetized region of the component having a first angular position.
Figure 6:
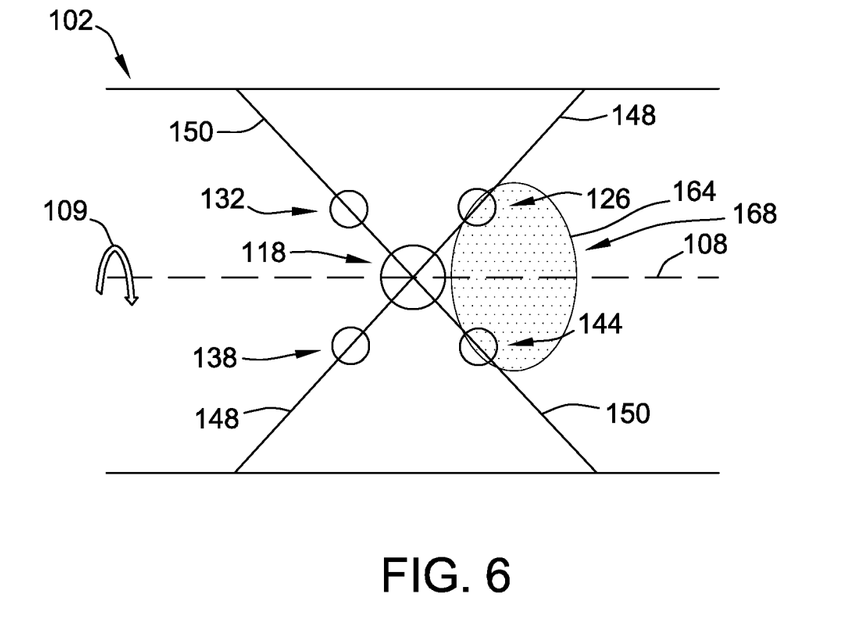
FIG. 6 is a schematic illustration of the sensor shown in FIG. 2 when measuring torque on the component shown in FIG. 1 at a second angular position of the second residually magnetized region shown in FIG. 5.

When first residually magnetized region 158 has first angular position 160 (as shown in FIG. 3), and thus affects only first branch element 126 and second branch element 132, then: $V_1=(V_o+\sigma+\Delta)$; $V_2=(V_o-\sigma+\Delta)$; $V_3=(V_o+\sigma)$; and $V_4=(V_o-\sigma)$. Computing device 110 calculates output voltage signal $V_\tau$ as follows:

$V_{1\text{-}3}=V_1-V_3=(V_o+\sigma+\Delta)-(V_o+\sigma)=+\Delta$; $V_{1\text{-}3}>0$, $V_1'=V_1-V_{1\text{-}3}=(V_o+\sigma)$ $V_{2\text{-}4}=V_2-V_4=(V_o-\sigma+\Delta)-(V_o-\sigma)=+\Delta$; $V_{2\text{-}4}>0$, $V_2'=V_2-V_{2\text{-}4}=(V_o-\sigma)$ $V_\tau=(V_1'+V_3)-(V_2'+V_4)=(V_o+\sigma)+(V_o+\sigma)$ [($V_o-\sigma)+(V_o-\sigma)]=4\sigma$ When first residually magnetized region 158 has second angular position 162 (as shown in FIG. 4), and thus affects only third branch element 138 and fourth branch element 144, then: $V_1=(V_o+\sigma)$; $V_2=(V_o-\sigma)$; $V_3=(V_0+\sigma+\Delta)$; and $V_4=(V_0-\sigma+\Delta)$. Computing device 110 calculates output voltage signal $V_\tau$ as follows:

$V_{1\text{-}3}=V_1-V_3=(V_o+\sigma)-(V_o+\sigma+\Delta)=-\Delta$; $V_{1\text{-}3}>0$, $V_3'=V_3-|V_{1\text{-}3}|=(V_o+\sigma)$ $V_{2\text{-}4}=V_2-V_4=(V_o-\sigma)-(V_o-\sigma+\Delta)=-\Delta$; $V_{2\text{-}4}>0$, $V_4'=V_4-|V_{2\text{-}4}|=(V_o-\sigma)$ $V_\tau=(V_1'+V_3)-(V_2'+V_4)=(V_o+\sigma)+(V_o+\sigma)-[(V_o-\sigma)+(V_o-\sigma)]=4\sigma$ As another example of system 107 in operation using sensor 117, FIGS. 5 and 6 are schematic illustrations of sensor 117 when measuring torque on component 102 at a second residually magnetized region 164 of component 102 having a first angular position 166 and a second angular position 168, respectively. More specifically, as component 102 rotates about axis 108, second residually magnetized region 164 likewise rotates about axis 108, thereby traveling from first angular position 166 to second angular position 168. In that regard, FIG. 5 illustrates second residually magnetized region 164 at first angular position 166, and FIG. 6 illustrates second residually magnetized region 164 at second angular position 168.

Figure 7:
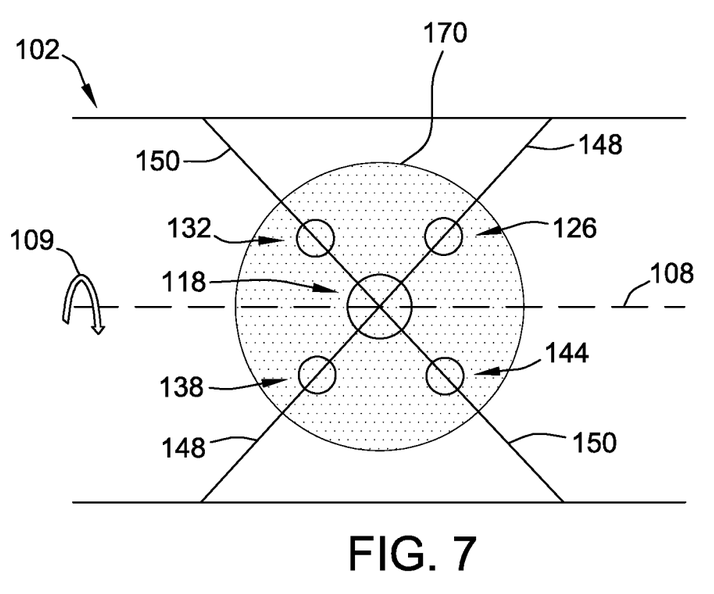
FIG. 7 is a schematic illustration of the sensor shown in FIG. 2 when measuring torque on the component shown in FIG. 1 at a third residually magnetized region of the component.

When second residually magnetized region 164 has first angular position 166 (as shown in FIG. 5), and thus affects only first branch element 126, then: $V_1=(V_0+G+\Delta)$; $V_2=(V_o-\sigma)$; $V_3=(V_o+\sigma)$; and $V_4=(V_o-\sigma)$. Computing device 110 calculates output voltage signal $V_\tau$, as follows:

$V_{1\text{-}3}=V_1-V_3=(V_o+\sigma+\Delta)-(V_o+\sigma)=+\Delta$; $V_{1\text{-}3}>0$, $V_1'=V_1-V_{1\text{-}3}=(V_o+\sigma)$ $V_{2\text{-}4}=V_2-V_4=(V_o-\sigma)-(V_o-\sigma)=0$; $V_{2\text{-}4}=0$, $V_2=V_4$ $V_\tau=(V_1'+V_3)-(V_2+V_4)=(V_o+\sigma)+(V_o+\sigma)-[(V_o-\sigma)+(V_o-\sigma)]=4\sigma$ When second residually magnetized region 164 has second angular position 168 (as shown in FIG. 6), and thus affects only first branch element 126 and fourth branch element 144, then: $V_1=(V_o+\sigma+\Delta)$; $V_2=(V_o-\sigma)$; $V_3=(V_o+\sigma)$; and $V_4=(V_o-\sigma+\Delta)$. Computing device 110 calculates output voltage signal $V_\tau$ as follows:

$V_{1\text{-}3}=V_1-V_3=(V_o+\sigma+\Delta)-(V_o+\sigma)=+\Delta$; $V_{1\text{-}3}>0$, $V_1'=V_1-V_{1\text{-}3}=(V_o+\sigma)$ $V_{2\text{-}4}=V_2-V_4=(V_o-\sigma)-(V_o-\sigma+\Delta)=-\Delta$; $V_{2\text{-}4}<0$, $V_4'V_4-|V_{2\text{-}4}|=(V_o-\sigma)$ $V_\tau=(V_1'+V_3)-(V_2+V_4')=(V_o+\sigma)+(V_o+\sigma)-[(V_o-\sigma)+(V_o-\sigma)]=4\sigma$ As yet another example of system 107 in operation using sensor 117, FIG. 7 is a schematic illustration of torque sensor 117 when measuring torque on component 102 at a third residually magnetized region 170 of component 102. Notably, third residually magnetized region 170 is sized and positioned such that, as component 102 rotates about axis 108, third residually magnetized region 170 simultaneously affects all branch elements 126, 132, 138, and 144 throughout each rotation of component 102. More specifically, throughout each rotation of component 102: $V_1=(V_o+\sigma+\Delta)$; $V_2=(V_o-\sigma+\Delta)$; $V_3=(V_o+\sigma+\Delta)$; and $V_4=(V_o\sigma+\Delta)$. Thus, throughout each rotation of component 102, computing device 110 calculates output voltage signal $V_T$, as follows:

$V_{1\text{-}3}=V_1-V_3=(V_o+\sigma+\Delta)-(V_o+\sigma+\Delta)=0$; $V_{1\text{-}3}=0$, $V_1=V_3$ $V_{2\text{-}4}=V_2-V_4=(V_o-\sigma+\Delta)-(V_o-\sigma+\Delta)=0$; $V_{2\text{-}4}=0$, $V_2=V_4$ $V_\tau=(V_1+V_3)-(V_2+V_4)=(V_o+\sigma+\Delta)+(V_o+\sigma+\Delta)-[(V_o-\sigma+\Delta)+(V_o-\sigma+\Delta)]=4\sigma$ The above-described embodiments include at least the following technical effects: (1) determining that a sensor is affected by a residually magnetized region of a component having a characteristic that the sensor is sensing; (2) accurately measuring a structural or functional aspect of the component (e.g., the torque on the component) by canceling out the effect of the component's residually magnetized region on the sensor; and (3) monitoring the structural or functional aspect of the component (e.g., the torque on the component) to identify when the aspect of the component exceeds a predefined value or is otherwise outside of a predefined range of values. Notably, the methods described herein can be realized in either the analog or digital domain.

The methods and systems described herein facilitate measuring the torque on a component using a torque sensor. More specifically, the methods and systems facilitate sensing an electromagnetic characteristic of the component using the torque sensor, and determining at a computer communicatively coupled to the sensor that the sensor is affected by a residually magnetized region of the component. Moreover, the methods and systems facilitate generating a torque signal that negates the effect of the residually magnetized region of the component on the torque sensor. As such, the methods and systems facilitate a more accurate measurement of the torque on the component (e.g., a dynamic torque measurement), and thus facilitate a more accurate monitoring of the torque on the component (e.g., in real time). The methods and systems therefore facilitate extending the useful life of a rotating machine having the component by enabling a more accurate identification of when the torque on the component exceeds a predefined value or is otherwise outside of a predefined range of values.

Exemplary embodiments of systems and methods are described above in detail. The systems and methods described herein are not limited to the specific embodiments described herein, but rather, components of the systems and methods may be utilized independently and separately from other components described herein. For example, the systems and methods described herein may have other applications not limited to practice in measuring the torque on a rotatable component, as described herein. Rather, the systems and methods described herein can be implemented and utilized in connection with various other applications aside from torque-measurement.

While the invention has been described in terms of various specific embodiments, those skilled in the art will recognize that the invention can be practiced with modification within the spirit and scope of the claims.

The invention claimed is:

1. A system, comprising:
a sensor for sensing an electromagnetic characteristic of a component having a residually magnetized region and transmitting a first signal and a second signal that are indicative of the electromagnetic characteristic; and
a computer communicatively coupled to said sensor for receiving the first signal and the second signal, said computer comprising a processor and a memory, said processor programmed to determine, using the first signal and the second signal, that said sensor is affected by the residually magnetized region of the component,
wherein said processor is programmed to compare the first signal and the second signal and make the determination by identifying that the first signal is different than the second signal, and
wherein said processor is programmed to modify at least one of the first signal and the second signal to account for the effect of the residually magnetized region.

2. A system in accordance with claim 1, wherein said first signal and said second signal are voltage signals or current signals.

3. A system in accordance with claim 1, wherein the electromagnetic characteristic is a magnetic permeability of the component.

4. A system in accordance with claim 1, wherein said sensor is one from the group consisting of an electromagnetic sensor, a magnetostrictive sensor, a stress sensor, and an angular position sensor.

5. A method, comprising:
transmitting, from a sensor that senses an electromagnetic characteristic of a component having a residually magnetized region, a first signal and a second signal that are indicative of the electromagnetic characteristic;
receiving the first signal and the second signal at a computer that is communicatively coupled to the sensor and has a processor and a memory; and
determining, at the computer and using the first signal and the second signal, that the sensor is affected by the residually magnetized region of the component, wherein said determining comprises, at the computer, comparing the first signal and the second signal and identifying that the first signal is different than the second signal, and
modifying, at the computer, at least one of the first signal and the second signal to account for the effect of the residually magnetized region.

6. A method in accordance with claim 5, wherein said first signal and said second signal are voltage signals or current signals.

7. A method in accordance with claim 5, wherein the electromagnetic characteristic is a magnetic permeability of the component.

8. A method in accordance with claim 5, wherein said sensor is one from the group consisting of an electromagnetic sensor, a magnetostrictive sensor, a stress sensor, and an angular position sensor.

9. A computer, comprising:
a memory; and
a processor selectively coupled to a sensor for receiving a first signal and a second signal that are indicative of an electromagnetic characteristic of a component, said processor programmed to determine, using the first signal and the second signal, that the sensor is affected by the residually magnetized region of the component,
wherein said processor is programmed to compare the first signal and the second signal and make the determination by identifying that the first signal is different than the second signal, and
wherein said processor is programmed to modify at least one of the first signal and the second signal to account for the effect of the residually magnetized region.

10. A computer in accordance with claim 9, wherein the first signal and the second signal are indicative of a magnetic permeability of the component.

11. A computer in accordance with claim 9, wherein said processor is programmed to determine that the first signal is different than the second signal by subtracting the first signal from the second signal to identify a difference therebetween.

12. A computer in accordance with claim 9, wherein said processor is programmed to account for the effect of the residually magnetized region by subtracting the difference from the first signal.

13. A computer in accordance with claim 9, wherein said first signal and said second signal are voltage signals or current signals.

14. A computer in accordance with claim 9, wherein the first signal is a first voltage signal and a second voltage signal, wherein the second signal is a third voltage signal and a fourth voltage signal, and wherein said processor is programmed to compare the first signal and the second signal by comparing the first voltage signal with the second voltage signal and by comparing the third voltage signal with the fourth voltage signal.

15. A computer in accordance with claim 9, wherein said sensor is one from the group consisting of an electromagnetic sensor, a magnetostrictive sensor, a stress sensor, and an angular position sensor.

* * * * *